(12) United States Patent
Kuhlemann et al.

(10) Patent No.: US 12,128,484 B2
(45) Date of Patent: Oct. 29, 2024

(54) CUTTING TOOL WITH MODULAR POCKET WALL

(71) Applicant: Kennametal Inc., Latrobe, PA (US)

(72) Inventors: Patrick Kuhlemann, Fuerth (DE);
Michael Schuffenhauer, Fuerth (DE);
Marcelo Euripedes da Silva, Piracicabo (BR); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 97 days.

(21) Appl. No.: 17/868,966

(22) Filed: Jul. 20, 2022

(65) Prior Publication Data

US 2024/0024958 A1    Jan. 25, 2024

(51) Int. Cl.
*B23B 51/02* (2006.01)
*B23B 27/16* (2006.01)
*B23B 51/00* (2006.01)
*B23C 5/22* (2006.01)

(52) U.S. Cl.
CPC .......... *B23B 27/16* (2013.01); *B23B 51/0003* (2022.01); *B23B 51/0004* (2022.01); *B23B 51/02* (2013.01); *B23C 5/22* (2013.01); *B23B 2205/04* (2013.01)

(58) Field of Classification Search
CPC .. B23C 5/26; B23C 5/006; B23C 5/10; B23C 9/005; B23C 2210/02; B23C 2240/24; B23B 2240/36; B23B 2251/02
See application file for complete search history.

(56) References Cited

U.S. PATENT DOCUMENTS

| | | | | |
|---|---|---|---|---|
| 29,883 | A | * 9/1860 | Hathaway | ............... B23B 51/02 |
| | | | | 408/233 |
| 137,744 | A | * 4/1873 | West | ....................... E21B 17/22 |
| | | | | 175/323 |
| 2,259,611 | A | 10/1941 | Burger | |
| 3,994,615 | A | * 11/1976 | Narang | ............... B23B 31/0261 |
| | | | | 408/233 |
| 1,329,091 | A | 5/1982 | Erkfritz | |
| 4,545,711 | A | * 10/1985 | Dooley | ................. B23B 27/007 |
| | | | | 407/35 |
| 6,109,841 | A | * 8/2000 | Johne | ...................... B23B 51/00 |
| | | | | 408/233 |

(Continued)

FOREIGN PATENT DOCUMENTS

| CN | 105750598 A | * 7/2016 | ............. B23B 51/00 |
|---|---|---|---|
| CN | 112453506 A | 3/2021 | |

(Continued)

*Primary Examiner* — Nicole N Ramos
(74) *Attorney, Agent, or Firm* — Christopher J. Owens

(57) ABSTRACT

A cutting tool includes a base body and a cutting head at least partially disposed within a modular pocket of the base body. The modular pocket is formed by at least one wall section removably attached to the base body. In one variation, a non-removable portion of the base body also forms part of the modular pocket. In another variation, the modular pocket is formed by two removable wall sections on opposite sides of the modular pocket. In yet another variation, the removable wall sections include a clamping portion to exert a downward force on the cutting head to enable mounting the cutting head in the modular pocket using an interference fit.

15 Claims, 8 Drawing Sheets

(56) References Cited

U.S. PATENT DOCUMENTS

| | | | |
|---|---|---|---|
| 6,506,003 B1 | 1/2003 | Erickson | |
| 2003/0210963 A1* | 11/2003 | Kakai | B23B 31/1107 408/231 |
| 2005/0098359 A1* | 5/2005 | Lee | B23B 51/0473 299/109 |
| 2006/0140730 A1 | 6/2006 | Schlagenhauf et al. | |
| 2008/0175676 A1 | 7/2008 | Prichard et al. | |
| 2008/0175679 A1 | 7/2008 | Prichard et al. | |
| 2008/0279645 A1 | 11/2008 | Bae | |
| 2008/0304923 A1 | 12/2008 | Ortlund et al. | |
| 2009/0092455 A1* | 4/2009 | Meyer | B23B 51/126 408/223 |
| 2009/0283975 A1* | 11/2009 | Kretzschmann | B23B 31/1077 408/56 |
| 2010/0316453 A1 | 12/2010 | Bronshteyn et al. | |
| 2011/0008114 A1 | 1/2011 | Wang | |
| 2011/0194907 A1 | 8/2011 | Guy | |
| 2011/0262232 A1* | 10/2011 | Chen | B23C 5/109 407/46 |
| 2015/0073417 A1 | 3/2015 | Stone et al. | |
| 2017/0050248 A1* | 2/2017 | Luik | B23C 5/28 |
| 2018/0009042 A1* | 1/2018 | Chen | B23B 31/11 |
| 2018/0264562 A1 | 9/2018 | Zettler | |
| 2019/0126361 A1 | 5/2019 | Hecht et al. | |
| 2019/0210125 A1* | 7/2019 | Ning | B23B 31/005 |
| 2021/0001438 A1 | 1/2021 | Royer | |
| 2021/0354214 A1* | 11/2021 | Chen | B23C 5/06 |

FOREIGN PATENT DOCUMENTS

| | | | | |
|---|---|---|---|---|
| JP | 11156609 A | * | 6/1999 | |
| JP | 2006167871 A | * | 6/2006 | |
| JP | 2008012600 A | * | 1/2008 | |
| JP | 2011136415 A | * | 7/2011 | B23B 51/02 |
| KR | 2010021099 A | * | 2/2010 | |

* cited by examiner

CUTTING TOOL WITH MODULAR POCKET WALL

FIELD OF THE DISCLOSURE

In general, the disclosure relates to cutting tools for performing machining operations on a workpiece, and more particularly, to a cutting tool with at least one modular pocket wall that allows the user to select combinations of the various components of the cutting tool based on physical properties of the various components.

BACKGROUND OF THE DISCLOSURE

Conventional cutting tools can be of both one-part and multi-part design. Cutting tools of the type that make use of a holder part or tool body, as well as a separate, replaceable cutting head or insert, are especially common and are known as a modular cutting tool. Such modular cutting tools may be of widely varying shapes and include, for example, drilling tools, milling tools, thread cutters, and the like.

Typically, the modular rotary cutting tool, such as a drill, is made of a main body with a replaceable carbide cutting head or cutting insert. This configuration allows the user to save money by replacing the carbide cutting head several times before replacing the main body, typically made of steel. However, one limitation of this configuration is the need to replace the entire main body when only a front portion of the main body needs to be replaced because this portion is subjected to high forces and wear.

SUMMARY OF THE DISCLOSURE

The problem of changing only the front portion of the main body to avoid waste of material and money is solved by providing a modular cutting tool comprising a base body and a modular pocket for supporting a replaceable cutting head or replaceable cutting insert.

In one aspect, a modular cutting tool comprises a base body; and a cutting head at least partially disposed within a modular pocket of the base body, wherein the modular pocket of the base body is formed by at least one wall section removably attached to the base body

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

It will be readily understood that the components of embodiments, as generally described and illustrated in the figures herein, may be arranged and designed in a wide variety of different configurations in addition to the described exemplary embodiments. Thus, the following more detailed description of the embodiments, as represented in the figures, is not intended to limit the scope of the embodiments, as claimed, but is merely representative of exemplary embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments. One skilled in the relevant art may well recognize, however, that embodiments can be practiced without at least one of the specific details thereof, or can be practiced with other methods, components, materials, et cetera. In other instances, well-known structures, materials, or operations are not shown or described in detail to avoid obscuring aspects of one or more embodiments.

Figure 1:
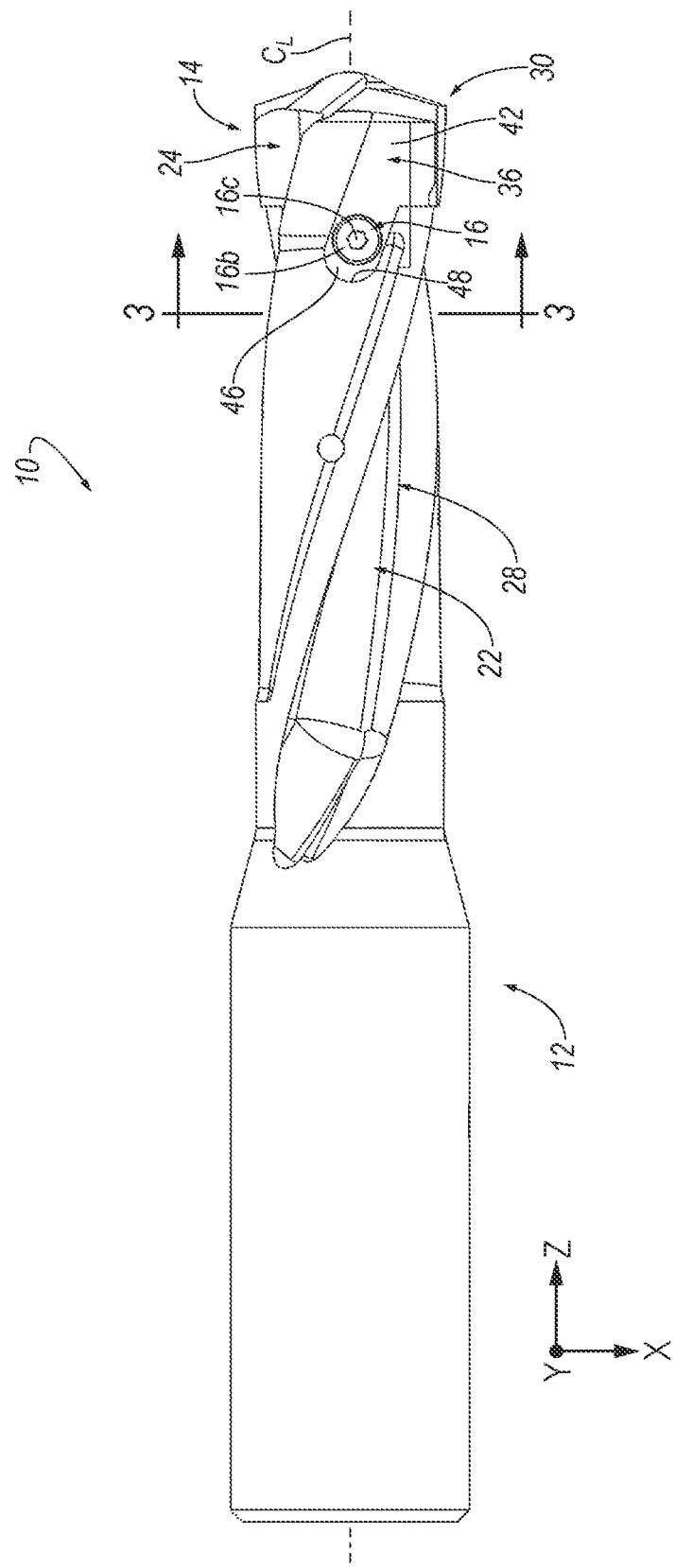
FIG. 1 is an elevational view of a cutting tool in which one wall section of a modular pocket is removably attached to a base body according to an aspect of the invention.
Figure 2:
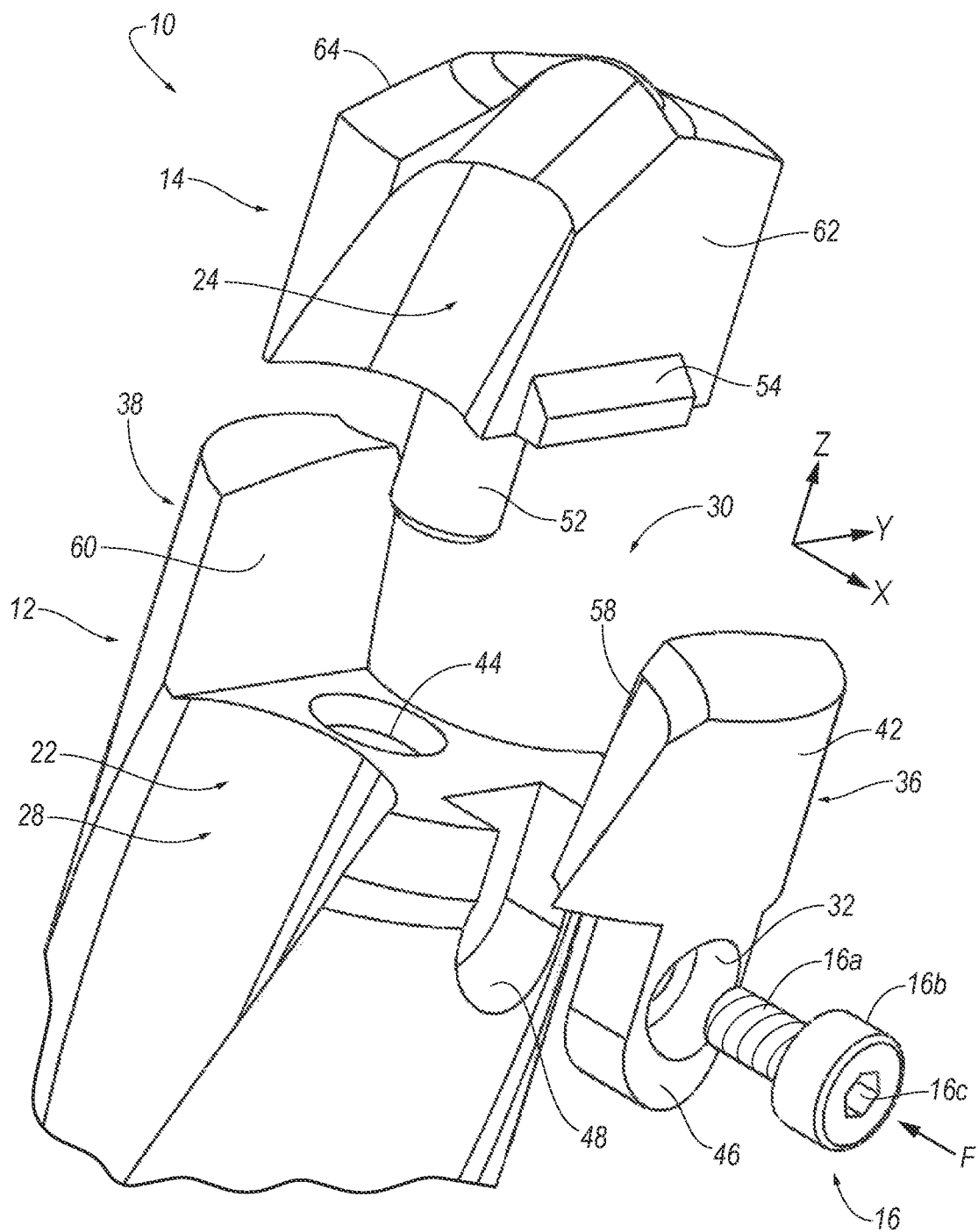
FIG. 2 is an enlarged exploded view of the modular pocket of the cutting tool of FIG. 1.

Referring now to FIGS. 1 and 2, a cutting tool 10 is shown according to an embodiment of the invention. In general, the cutting tool 10 has basic components:
1) a base body 12;
2) a cutting head 14; and
4) a threaded fastener 16.

All three basic components are produced as separate parts. The cutting head 14 can be fastened to, or installed on, the base body 12 in a detachable and interchangeable manner using the threaded fastener 16. For purely illustrative purposes, the cutting tool 10 comprises a twist drill that includes a pair of helical flutes 22 disposed along the sides of the cutting tool 10, in diametric opposition to one another. Each flute 22 extends over a base body 12 and the cutting head 14. However, it should be appreciated that the cutting tool 10 can also be designed as a countersinking, milling, or reaming tool.

The base body 12 and the cutting head 14 can be made of any suitable material. In one example, the base body 12 and the cutting head 14 can be made of different materials. For example, the base body 12 can be made of tool steel and the cutting head 14 can be made of carbide material. However, the base body 12 and the cutting head 14 can be made of the same material, if desired.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" or "elongated" is defined as something that is longer than it is wide. In other words, the width is smaller than its length.

As used herein, a "threaded fastener" is defined as a fastener having a tapered or non-tapered shank with a helical thread and is driven by rotating the shank with a tool.

Generally, a central, longitudinal axis, A, is defined through the cutting tool 10 (common to both the base body 12 and the cutting head 14, about which the cutting tool 10 rotates during operation. A "cutting head" may alternatively be referred to, herein and elsewhere, with any of a variety of other suitable terms such as "tip", "insert", "cutting tip", or "cutting insert". As shown in FIGS. 1 and 2, two flutes 22 are provided in diametric opposition to one another with only one flute being visible in some drawings. It should be noted that each flute 22 includes portions that are disposed in the base body 12 and the cutting head 14. Specifically, each flute 22 has a lateral recess forming part of a flute or cutting head flute portion 24 formed in cutting head 14. Similarly, a corresponding or complementing lateral recess or base body flute portion 28 is formed in the base body 12. Thus, once the cutting head 14 is installed on the base body 12, the corresponding portions of the flute 22 in the base body 12 and the cutting head 14 will align to form flutes that are generally continuous and undistorted. Although two flutes 22 are depicted herein, it should be understood that any number of flutes 22 (including only one) is possible, depending on the physical dimensions of the cutting tool 10.

In the depiction of FIG. 1, the cutting head flute portion 24 emerges at a leading end of the cutting tool 10. The leading end is defined for semantic purposes and is that end that engages a work piece (not shown) during a cutting operation. During cutting operations, the cutting tool 10 is mounted in the rotary cutting tool, rotated, and advanced progressively into the work piece (not shown) as cutting progresses. That end of the cutting head 14 opposite the leading end is termed the trailing end. The terms "leading end" and "trailing end" are semantic devices that apply equally to the base body 12 as they connote directional orientation with respect to a central, longitudinal axis, CL, rather than specific structure. The leading end penetrates a work piece (not shown), and the trailing end is that end opposed to the leading end.

Figure 3:
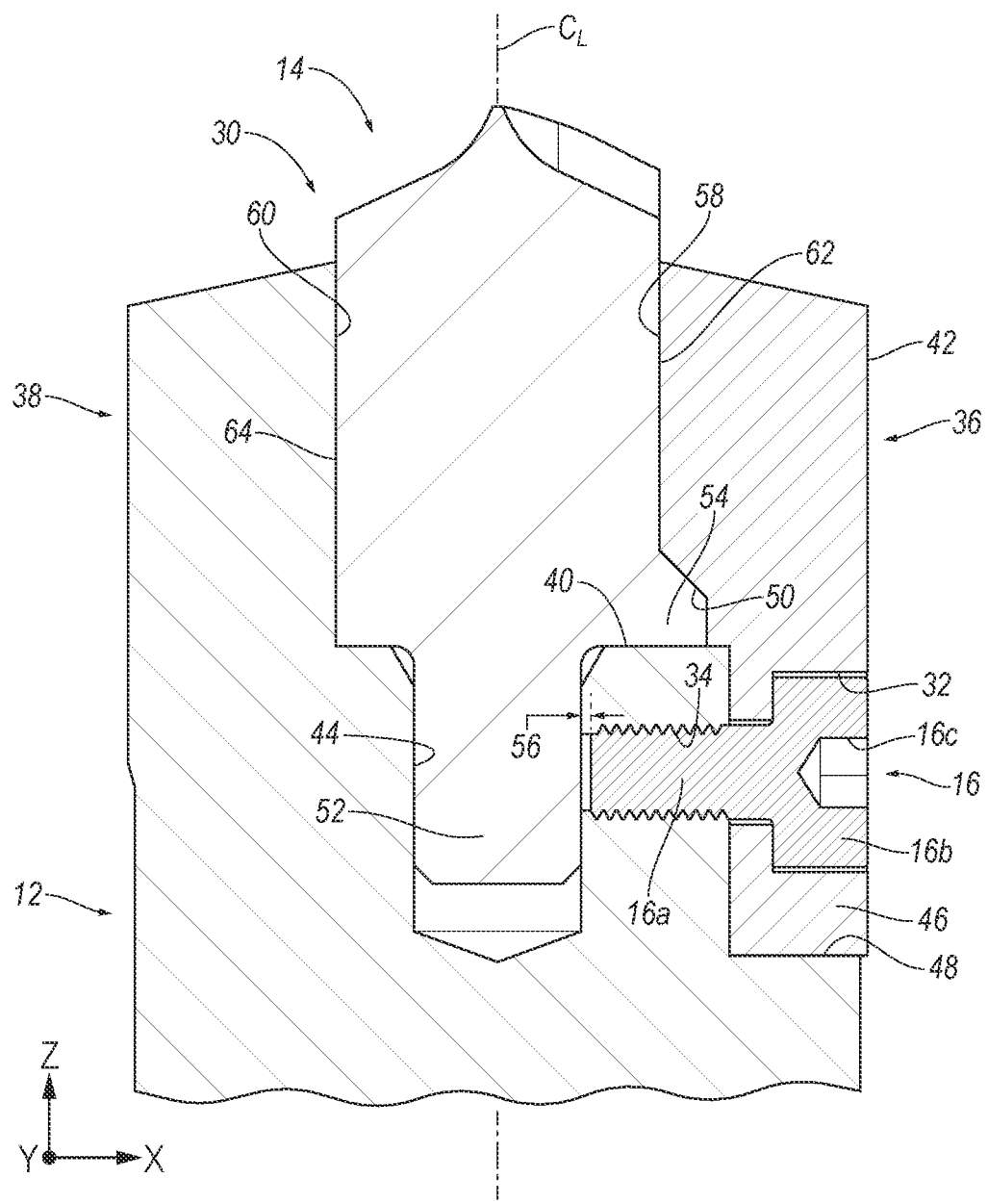
FIG. 3 is a cross-sectional view taken along line 3-3 of FIG. 1.

Referring now to FIGS. 2 and 3, one aspect of the invention is that the leading end of the base body 12 includes a modular pocket, indicated generally at 30. The principal elements of the pocket 30 include two generally symmetrical and similar castellated wall sections 36, 38. In the illustrated embodiment, one wall section 36 is removably attached to the base body 12, while the other wall section 38 is essentially a continuation and integrally formed with the base body 12. The removable wall section 36 can be made of the same material or a different material than the base body 12. The pocket 30 has a central floor portion 40 that can be oriented transversely with respect to the central longitudinal axis, C L. Any or all of the central floor portion 40 and the wall sections 36, 38 serve as abutment surfaces that directly contact the cutting head 14 when the cutting head 12 is installed on the base body 12. Each wall section 36, 38 has a smooth outer surface 42 that generally conforms to and is generally coextensive with the generally cylindrical outer surface of the cutting tool 10. A bore 44 extends downward from the central floor portion 40 of the base body 12 for accommodating an axially extending coupling pin 52 of the cutting head 14.

The removable wall section 36 includes an aperture 32 for allowing the threaded fastener 16 to pass therethrough. Similarly, the base body 12 includes a threaded aperture 34 for enabling the threaded fastener 16 to be threaded therein. It should be noted that the aperture 32 can include threads, if desired. The threaded fastener 16 includes a threaded shank portion 16a and a non-threaded head portion 16b having a relatively larger diameter than the threaded shaft portion 16a. As is known in the art, the threaded fastener 16 has a recess 16c for allowing a tool (not shown), such as an Allen® wrench, and the like, to rotate the threaded fastener 16.

It should be appreciated that the removable wall section 36 can be removably attached to the base body 12 in a variety of acceptable methods. Referring now to FIG. 2, for example, the removable wall section 36 can be removably attached to the base body 12 using a downwardly extending ear 46 that cooperates with a compatible-shaped recess 48 formed in the base body 12. The ear 46 includes a threaded aperture 50 that is capable of receiving the threaded fastener 16 to provide a clamping force, F, in the direction of the arrow in FIG. 2 against the removable wall section 36 to press the removable wall section 36 against the base body 12 and the cutting head 14. Other acceptable methods of removably attaching the removable wall section 36 to the base body 12 are within the spirit and scope of the invention.

In another aspect shown in FIG. 3, the removable wall section 36 includes a dovetail shaped recess 50 capable of receiving a dovetail shaped portion 54 of the cutting head 14 to prevent unwanted axial movement of the cutting head 14 (i.e., in the z-direction) when mounted in the pocket 30 of the cutting tool 10. In the illustrated embodiment, the dovetail shaped recess 50 of the removable wall section 36 and the dovetail shaped portion 54 of the cutting head 16 are located adjacent the central floor portion 40 of the modular pocket 30. However, it will be appreciated that the dovetail shaped recess 50 and the dovetail shaped portion 54 of the cutting head 16 may be located at any desirable location along the cutting head 16, so long as unwanted axial movement of the cutting head 16 is minimized or eliminated. It should be noted that the threaded shank portion 16a of the threaded fastener 16 does not directly contact the coupling pin 52 of the cutting head 16 when the threaded fastener 16 removably attaches the wall section 36 to the base body 12, but a small gap 56 exists between the threaded fastener 16 and the coupling pin 52, as shown in FIG. 3.

Each of the wall sections 36, 38 have longitudinally extending inner contact surfaces 58, 60, respectively, that directly contact outer contact surfaces 62, 64 of the cutting head 16, respectively, to firmly secure the cutting head 16 within the modular pocket 30. In the illustrated embodiment, each contact surface 58, 60 is substantially parallel to the central, longitudinal axis, CL, of the cutting tool 10. However, it will be appreciated that the wall sections 36, 38 can receive the cutting head 14 by means of an interference fit in which the wall sections 36, 38 can be symmetrically inclined at a non-zero angle with respect to the central longitudinal axis, CL.

Figure 4:
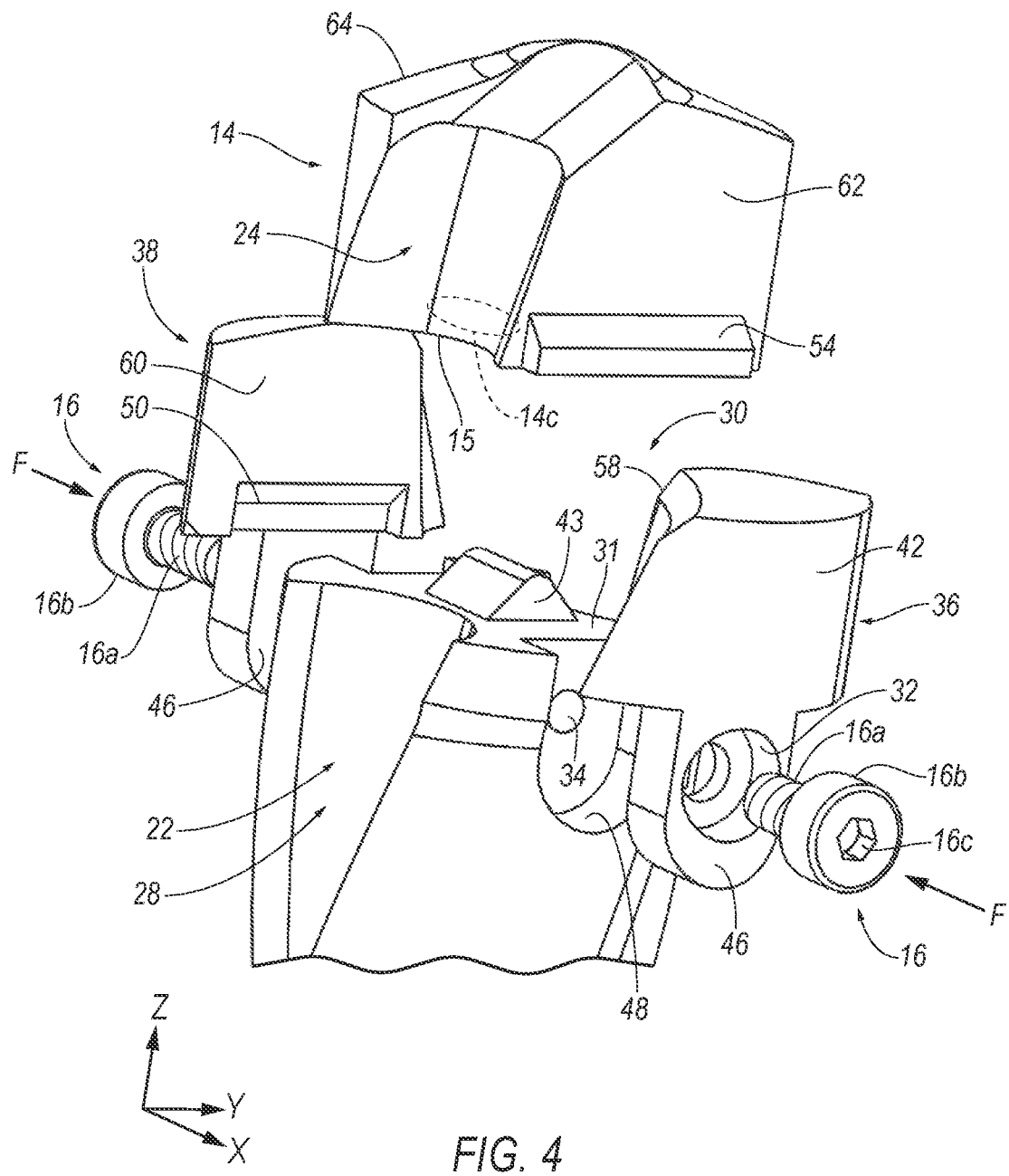
FIG. 4 is an enlarged front perspective view of the modular pocket of the cutting tool in which both wall sections are removably attached to the base body according to another aspect of the invention.

It should be realized that there are many different variations of the modular pocket 30 of the cutting tool 10. As described above, only one the wall sections 36, 38 is removably attached to the base body 12. Referring now to FIG. 4, a variation of the modular pocket 30 is shown according to another aspect of the invention. In this variation, the wall section 38 is also removably attached to the base body 12, rather than being continuous and integrally formed with the base body 12 as in the earlier embodiment. In other words, both wall sections 36, 38 are removably attached to the base body 12. Although not visible in FIG. 4, it should be appreciated that the removable wall section 38 includes a dovetail shaped portion 54 that is received in the dovetail shaped recess 50 in the cutting head 14, similar to the removable wall section 36.

Figure 7:
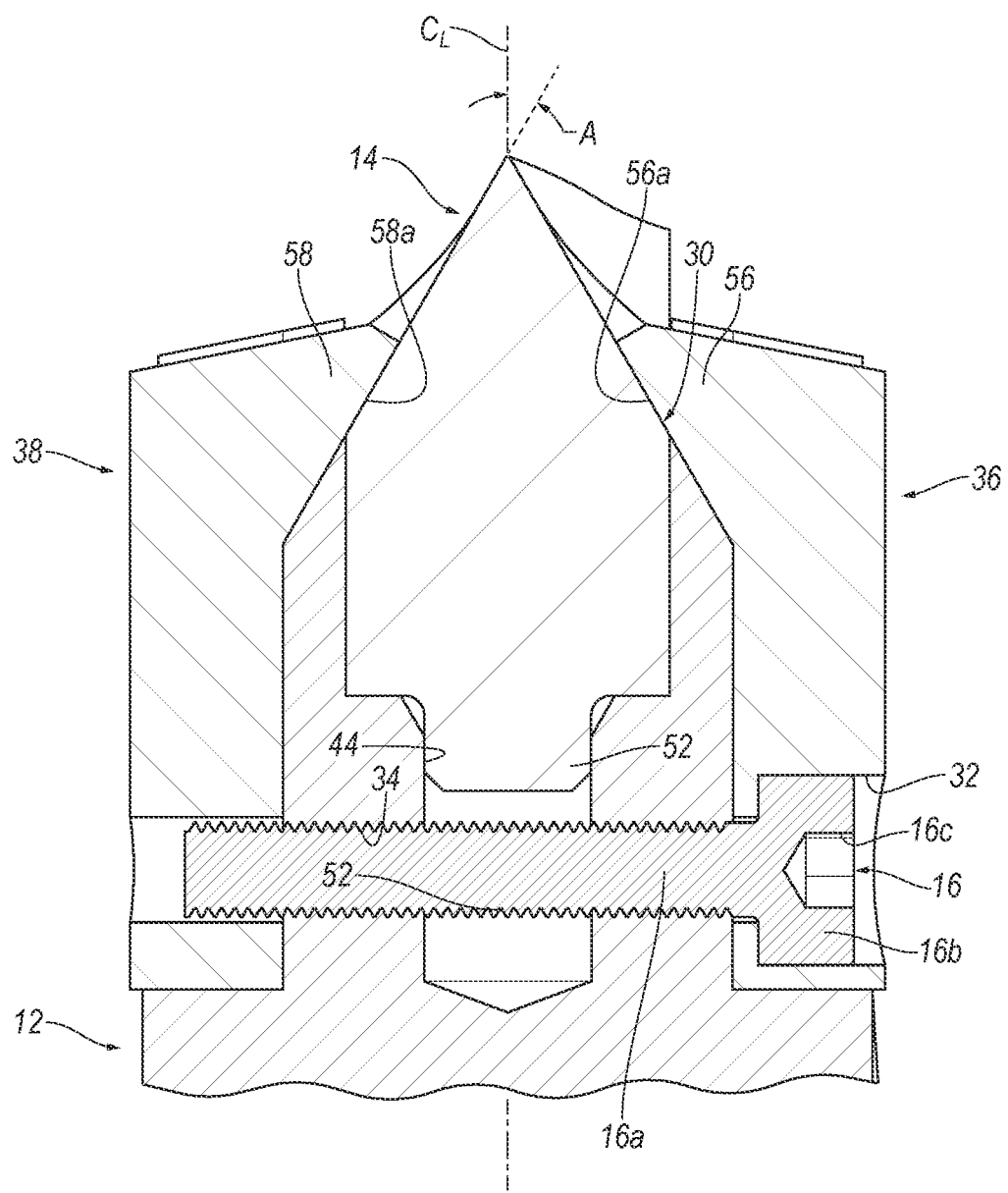
FIG. 7 is a cross-sectional view taken along line 7-7 of FIG. 6.

In the variation shown in FIG. 4, the cutting head 14 does not include the coupling pin 52 and corresponding bore 44. Rather, the cutting head 14 includes a recess 14c formed in a bottom surface 15 for receiving a protrusion 43 extending from a bottom surface or floor 31 of the pocket 30 in an axial direction (i.e., z-axis). In the illustrated, the protrusion 43 is generally V-shaped and the recess 14c has a corresponding shape. The purpose of the V-shaped protrusion 43 is for centering the cutting head 14 in the pocket 30. It should be appreciated that the protrusion 43 and corresponding recess 14c can have any desirable shape, so long as the cutting head 14 is sufficiently centered within the modular pocket 30. Also, it should be appreciated that the two threaded fasteners 16 (one for each wall section 36, 38) can be replaced by a single threaded fastener 16 by reducing the length of the coupling pin 52, as shown in FIG. 7.

Figure 5:
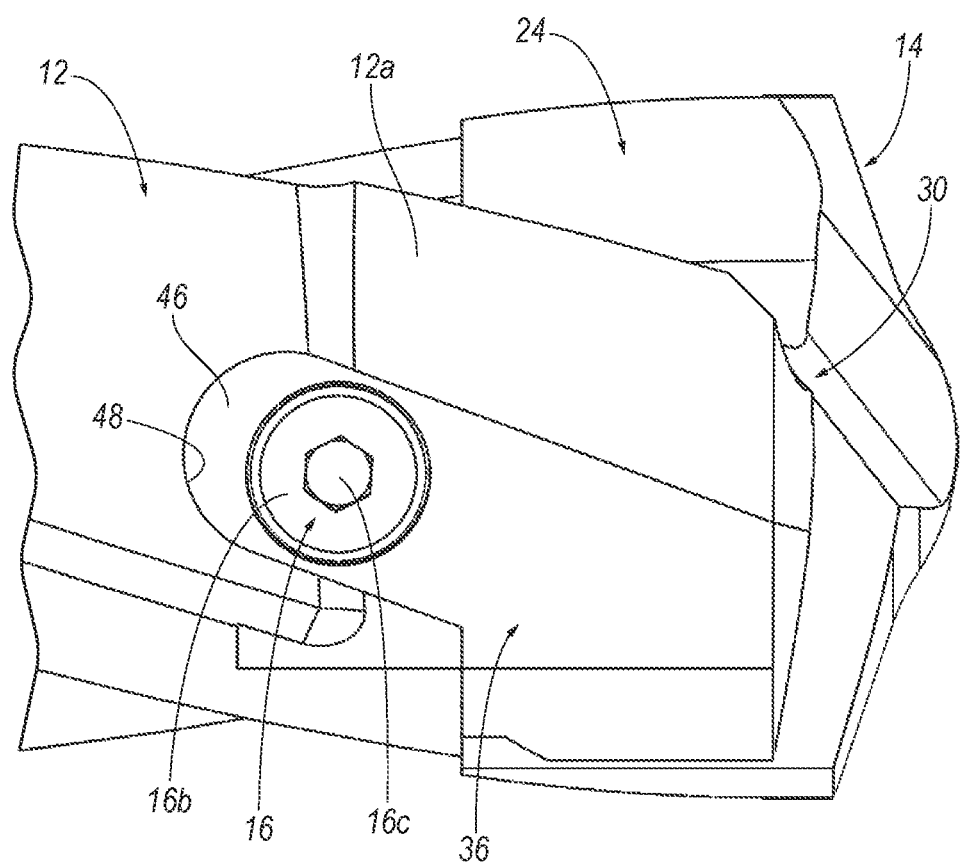
FIG. 5 is an enlarged side view of the modular pocket of the cutting tool in which a portion of the base body also forms the modular pocket according to another aspect of the invention.

As described above, the modular pocket 30 is formed by one or both of the entire wall sections 36, 38 being removably attached to the base body 12 to form the modular pocket 30. Referring now to FIG. 5, a variation of the modular pocket 30 is shown according to another aspect of the invention. In this variation, in addition to one or both wall sections 36, 38 being removably attached to the base body 12, the modular pocket 30 is also formed by a non-removable portion 12a of the base body 12. This variation may be desirable to provide additional support against cutting forces, if necessary. Although not visible in FIG. 5, it should be appreciated that one or both wall sections 36, 38 also includes a dovetail shaped portion 54 that is received in a dovetail shaped recess 50 in the cutting head 14, similar to the removable wall sections 36, 38 shown in the earlier embodiment.

Figure 6:
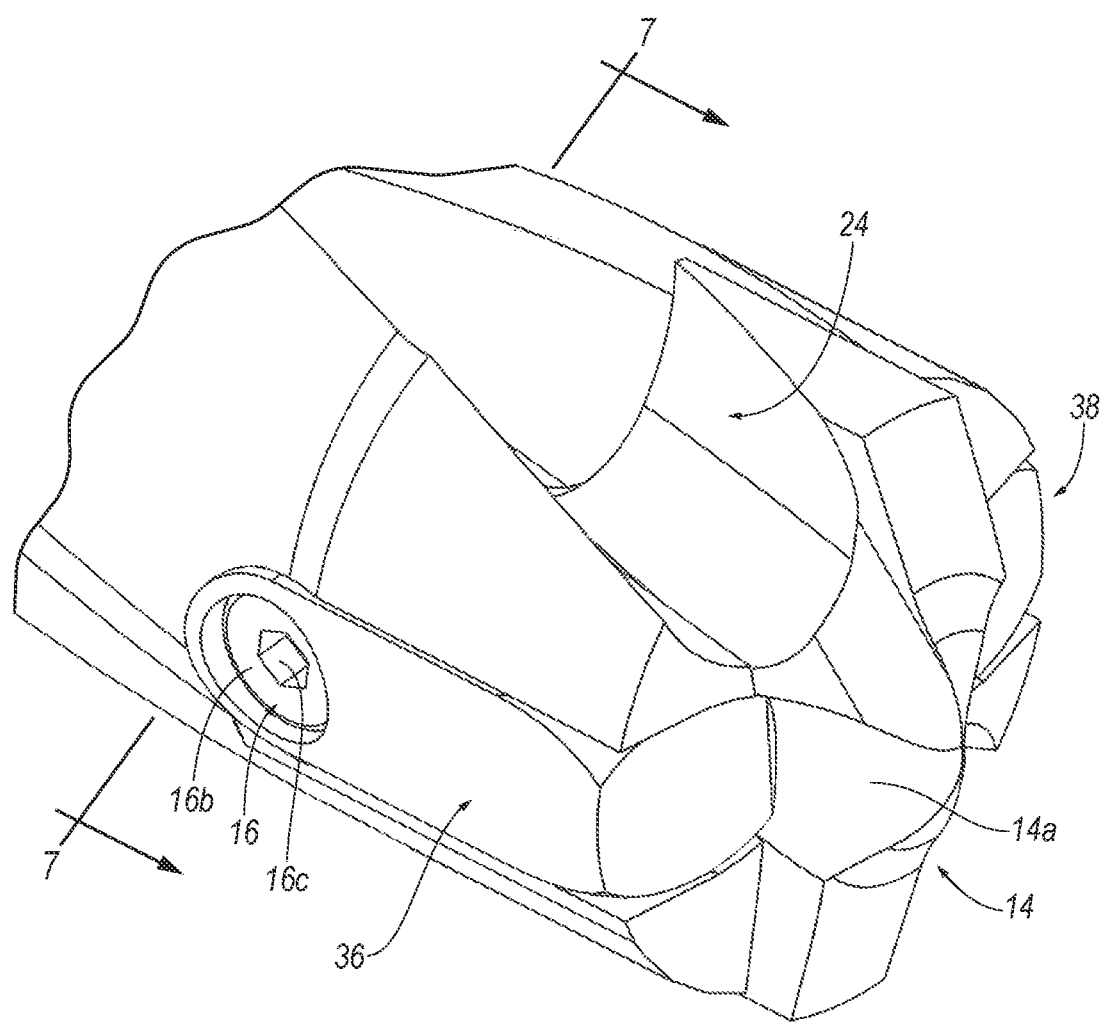
FIG. 6 is an enlarged front perspective view of the modular pocket of the cutting tool in which one or both wall sections include a clamping portion to provide a downward force on the cutting head when using an interference fit to secure the cutting head in the modular pocket according to another aspect of the invention.
Figure 8:
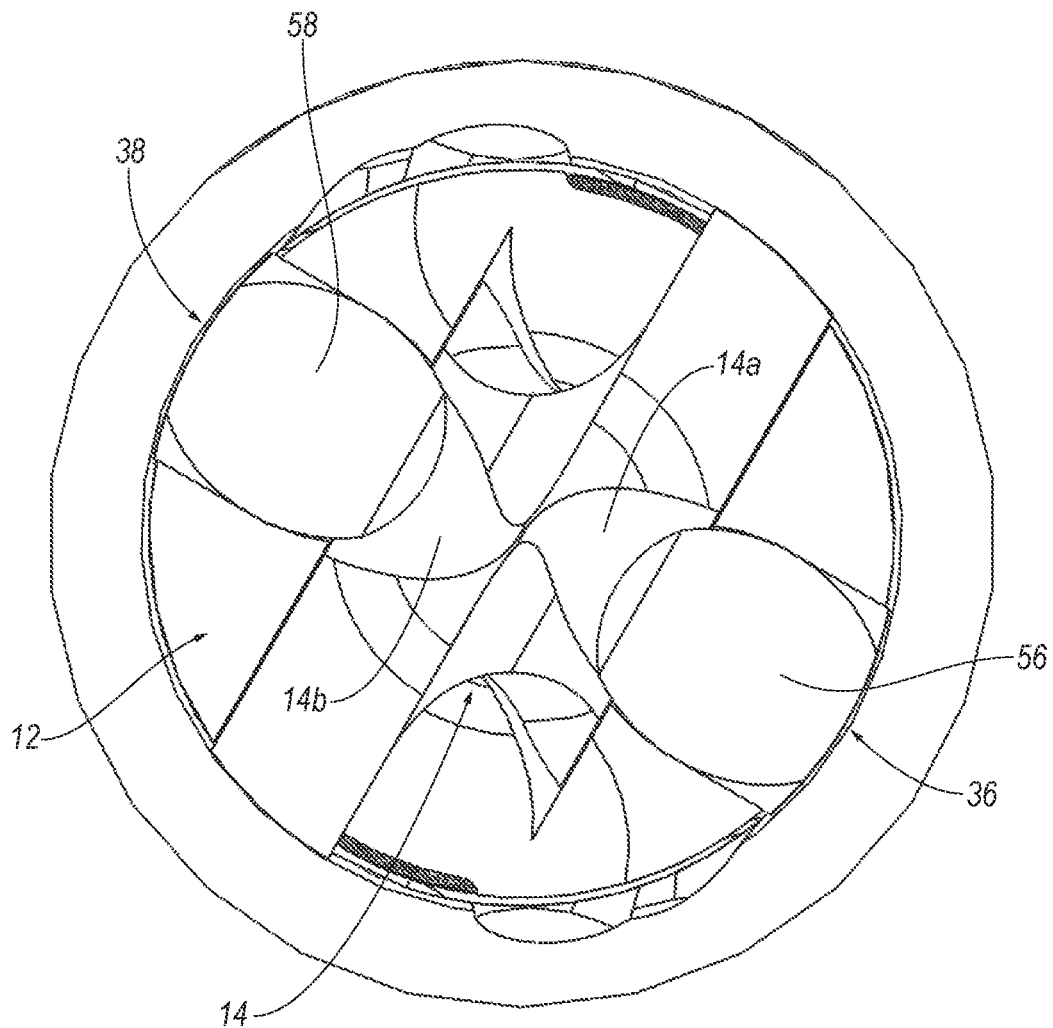
FIG. 8 is a top view of the cutting tool of FIG. 6 showing the clamping portions contacting outer contact surfaces of the cutting head.

In the earlier embodiments described above, it may not be possible to secure the cutting head 14 by using an interference fit. However, it may be desirable to secure the cutting head 14 in the modular pocket 30 by using an interference fit. Referring now to FIGS. 6-8, a variation of the modular pocket 30 is shown. In this variation, a portion of the base body 12 is disposed between one or both removable wall sections 36, 38. In addition, the removable wall sections 36, 38 include a clamping portion 56, 58, respectively. Each clamping portion 56, 58 has an inner surface 56a, 58a that contacts the cutting head 14 at a non-zero angle, A, with respect to the central, longitudinal axis, CL, of the cutting tool 10. As a result, each removable wall section 36, 38 exerts a force in a downward direction (i.e., toward the base body 12) on the cutting head 14 to pull the cutting head 14 in a downward direction into the modular pocket 30. This downward force can be sufficient to cause an interference fit between the cutting head 14 and the modular pocket 30 of the cutting tool 10. The angle, A, can be in a range between about 30 degrees and about 60 degrees, depending on the amount of desired downward force exerted on the cutting head 14. To assist in providing this downward force, the cutting head 14 may include outer surfaces 14a, 14b that cooperate with the clamping portions 56, 58 of the removable wall sections 36, 38, respectively.

Having described presently preferred embodiments the disclosure may be otherwise embodied within the scope of the appended claims.

What is claimed is:

1. A modular cutting tool, comprising:
   a base body having a base flute portion; and
   a cutting head at least partially disposed within a modular pocket of the base body, the cutting head having a cutting head flute portion and a dovetail shaped portion protruding radially outward therefrom,
   wherein the modular pocket of the base body is formed by at least one wall section removably attached to the base body by a threaded fastener, the at least one wall section including a dovetail shaped recess for receiving the dovetail shaped portion of the cutting head when the at least one wall section is removably attached to the base body, the threaded fastener being axially offset from the dovetail shaped portion, and
   wherein the base flute portion and the cutting head flute portion align to form a flute of the modular cutting tool when the cutting head is mounted on the base body.

2. The modular cutting tool of claim 1, wherein the modular pocket of the base body is formed by two wall sections removably attached to the base body.

3. The modular cutting tool of claim 1, wherein the threaded fastener has a threaded shaft portion and a non-threaded head portion having a relatively larger diameter than the threaded shaft portion.

4. The modular cutting tool of claim 1, wherein the base body is made of a different material than the at least one wall section.

5. The modular cutting tool of claim 1, wherein the base body is made of a different material than the cutting head.

6. The modular cutting tool according to claim 1, wherein the modular pocket of the base body is formed with two wall sections removably attached to the base body, and wherein a portion of the base body is disposed between each wall section and the cutting head.

7. The modular cutting tool according to claim 6, wherein each wall section includes a clamping portion that contacts the cutting head to provide a downward force on the cutting head to securely hold the cutting head in the modular pocket using an interference fit.

8. The modular cutting tool according to claim 1, wherein the modular pocket is formed by a non-removable portion of the base body and the at least one wall section removable attached to the base body.

9. The modular cutting tool according to claim 1, wherein the at least one wall section includes a downwardly extending ear that cooperates with a recess formed in the base body.

10. The modular cutting tool according to claim 9, wherein the downwardly extending ear includes a threaded aperture for receiving a threaded fastener for removably attaching the at least one wall section to the base body.

11. The modular cutting tool according to claim 1, wherein the at least one wall section directly contacts the cutting head when the at least one wall section is removably attached to the base body.

12. The modular cutting tool according to claim 1, wherein the cutting head includes a coupling pin received within a bore of the base body when the cutting head is mounted within the modular pocket.

13. The modular cutting tool according to claim 1, wherein the modular pocket of the base body is formed with two wall sections removably attached to the base body, and wherein the threaded fastener removably attaches both wall sections to the base body.

14. The modular cutting tool according to claim 1, wherein the cutting head has a bottom surface with a recess for receiving a protrusion extending from a floor of the modular pocket.

15. The modular cutting tool according to claim 1, wherein the modular cutting tool comprises a twist drill.

* * * * *